(12) United States Patent
Farres et al.

(10) Patent No.: US 11,691,608 B2
(45) Date of Patent: Jul. 4, 2023

(54) BY-PASS OF AIR SUPPLY PROTECTION FOR ELECTRONIC PARKING BRAKE SYSTEM AND VEHICLE COMPRISING SUCH SYSTEM

(71) Applicant: VOLVO LASTVAGNAR AB, Gothenburg (SE)

(72) Inventors: Lionel Farres, Heyrieux (FR); Christophe Long, Brindas (FR)

(73) Assignee: VOLVO LASTVAGNAR AB, Gothenburg (SE)

( * ) Notice: Subject to any disclaimer, the term of this patent is extended or adjusted under 35 U.S.C. 154(b) by 103 days.

(21) Appl. No.: 16/649,002

(22) PCT Filed: Oct. 4, 2017

(86) PCT No.: PCT/EP2017/075210
§ 371 (c)(1),
(2) Date: Mar. 19, 2020

(87) PCT Pub. No.: WO2019/068320
PCT Pub. Date: Apr. 11, 2019

(65) Prior Publication Data
US 2020/0290585 A1 Sep. 17, 2020

(51) Int. Cl.
*B60T 13/68* (2006.01)
*B60T 8/32* (2006.01)
(Continued)

(52) U.S. Cl.
CPC ............ *B60T 13/683* (2013.01); *B60T 8/327* (2013.01); *B60T 8/1708* (2013.01); *B60T 15/041* (2013.01);
(Continued)

(58) Field of Classification Search
CPC ...... B60T 13/38; B60T 13/385; B60T 13/265; B60T 13/268; B60T 13/261;
(Continued)

(56) References Cited

U.S. PATENT DOCUMENTS 3,929,381 A * 12/1975 Durling ................. B60T 13/263
303/118.1
6,079,790 A * 6/2000 Broome .................... B60T 8/00
137/625.64
(Continued)

FOREIGN PATENT DOCUMENTS

EP 0-268045 A2 * 9/1987 ............ B60T 13/263
EP 0394065 A2 10/1990
(Continued)

OTHER PUBLICATIONS

Translation of EP 2939891 A2. (Year: 2015).*
(Continued)

*Primary Examiner* — Thomas J Williams
(74) *Attorney, Agent, or Firm* — Venable LLP; Jeffri A Kaminski

(57) ABSTRACT

The invention concerns an electronic parking brake system (2), comprising an air supply (4), a check valve (6), connected to the air supply, an electro-pneumatic control unit (8), at least one park brake actuator (10), a relay valve (12), comprising a first port (12a) connected to the check valve, a second port (12b) connected to the electro-pneumatic control unit, a third port (12c) connected to the park brake actuator and a fourth port (12d) which is in communication with the atmosphere, and an electrically actuated valve (14), which is controlled by the electro-pneumatic control unit (8) and which includes a first orifice (14a) connected to a compressed air line (16) extending between the check valve and the air supply, a second orifice (14b), a third orifice (14c) connected to the electro-pneumatic control unit (8), and
(Continued)

preferably a vent orifice. The second orifice (14b) is connected to another compressed air line (18) extending between the check valve (6) and the first port (12a) of the relay valve (12).

7 Claims, 6 Drawing Sheets

(51) Int. Cl.
*B60T 8/17* (2006.01)
*B60T 15/04* (2006.01)

(52) U.S. Cl.
CPC ..... *B60T 2270/402* (2013.01); *B60Y 2400/81* (2013.01)

(58) Field of Classification Search
CPC ...... B60T 13/683; B60T 13/68; B60T 15/041; B60T 15/027; B60T 8/327; B60T 8/1708; B60T 13/263; B60T 13/36; B60Y 2400/81
See application file for complete search history.

(56) References Cited

U.S. PATENT DOCUMENTS 8,297,714 B2 * 10/2012 Bensch .................. B60T 8/362
303/7
2010/0025141 A1 2/2010 Bensch et al.

FOREIGN PATENT DOCUMENTS

| EP | 547407 A1 * | 6/1993 | ............ B60T 13/683 |
| EP | 2090481 A2 | 8/2009 | |
| EP | 2939891 A2 * | 11/2015 | ............. B60T 13/66 |
| EP | 2982555 A1 | 2/2016 | |
| GB | 2543037 A | 4/2017 | |

OTHER PUBLICATIONS

Translation of EP 0268045 A2. (Year: 1987).*
International Search Report and Written Opinion dated May 14, 2018 in corresponding International PCT Application No. PCT/EP2017/075210, 9 pages.

* cited by examiner

BY-PASS OF AIR SUPPLY PROTECTION FOR ELECTRONIC PARKING BRAKE SYSTEM AND VEHICLE COMPRISING SUCH SYSTEM

The present invention concerns an electronic parking brake system and a vehicle comprising such system.

In the automotive industry, the conventionally mechanical parking brake is progressively replaced by electronic parking brake. The control unit of an electronic parking brake requires however electrical energy to function. Accordingly, the failure of the electric power supply can be a problematic event in such electrically controlled brake systems as electric components, such as electric control systems and electrically actuated solenoid valves, can no longer be actuated. The driver may then be stuck inside the vehicle as he has no possibility to immobilize the vehicle.

US 2010/0025141 A1, which is probably the closest prior art, discloses an electronic parking brake system. In this disclosure, the control pressure present at the control input of the relay valve can be placed in communication with the air reservoir tank in the event of an unexpected failure of the electric power supply. By repeated actuation of the service brake in the case of a failed electric power supply, the pressure in the reservoir tank drops and implies the venting of the spring store parts of the spring brake cylinders. Thus, the spring actuators are activated and the parking brake is applied.

One drawback of this system is that an additional pressure sensor is needed to confine the control chamber of the relay valve when the pressure during normal operation drops below a critical pressure. This arrangement is complicated and costly.

EP 0 394 065 A2 discloses a vehicle braking system wherein a first valve is actuated by depression of the vehicle brake pedal in order to modulate a pressurized air supply with braking demand and wherein a second valve is disposed between the first valve and an auxiliary brake. The second valve is actuated in response to failure of the normal vehicle braking system to connect the output of the first valve to the auxiliary brake EP 2 090 481 A2 discloses a parking brake module wherein a trailer control module is controlled by a single-channel-pressure control module or the brake module during malfunction of an electrical brake circuit. The module is controlled by the trailer control module during malfunction of another electrical brake circuit.

The aim of the present invention is to propose an electronic parking brake system that remedies the abovementioned drawbacks.

To this end, the invention concerns an electronic parking brake system.

Thanks to the invention, there is no need of a pressure sensor to confine the control chamber of the relay valve when the pressure, during normal operation, drops below a critical pressure. Indeed, the control chamber of the relay valve is confined by the check valve itself because the check valve is bypassed only in the event of an electrical failure and/or when the pressure of the air supply falls below a critical threshold. In other words, the check valve is not bypassed in normal operating conditions of the EPB system. This arrangement is simpler and cheaper.

Further advantageous features of the electronic parking brake system are defined.

The invention also concerns a vehicle.

The invention will be better understood from reading the following description, given solely by way of two non-limiting examples and with reference to the appended drawings, which are schematic depictions, in which:

FIG. 1 represents an electronic parking brake system 2 (or EPB system) of a vehicle V. In the example, and as shown on FIG. 6, the vehicle V is a truck comprising a lorry and a trailer.

Figure 1:
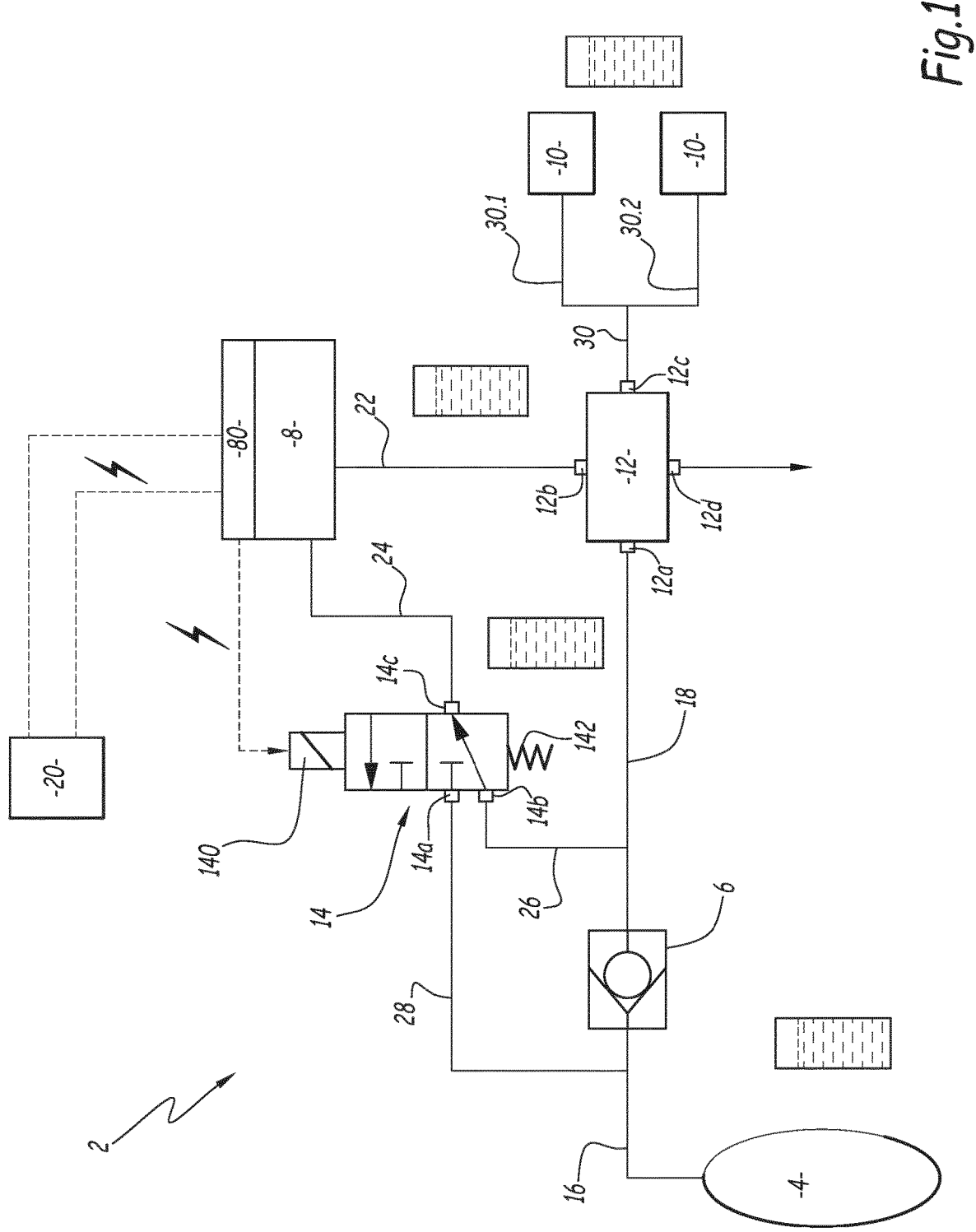
FIG. 1 is a flow chart representing a first embodiment of an electronic parking brake system in normal working conditions.

The EPB system 2 comprises at least one, preferably two park brake actuators 10.

In the example, and as know per se, each park brake actuator 10 includes a spring brake cylinder (not represented). The spring brake cylinder includes a pressurized chamber which is vented when the driver requests the application of the parking brake, and which, in turn, leads to the application of a braking effort arising from spring unloading. The spring brake cylinder chamber is pressurized with compressed air when the driver request parking brake release.

Advantageously, the driver may electronically command the application and release of the parking brake through a park brake input device (not represented), such as a hand brake lever or an operating switch. Such device is well known per se, that is why it is not described.

The EPB system 2 includes an air supply 4, in particular an air tank, and a check valve 6 connected to the air supply.

In this paper, the terms "upstream" and "downstream" shall be interpreted with regards to the flow of compressed air when each park brake actuator 10 is released, i.e. when compressed air is extracted from the air tank 4 to pressurize the spring brake cylinder chamber of the park brake actuator (s) 10. Accordingly, the air supply 4 is located fully upstream and the park brake actuators 10 are located fully downstream.

The check valve 6 is known per se, for example from US 2010/0025141 A1. The function of the check valve 6 is to protect each spring brake cylinder chamber from a pressure drop in the air supply. The check valve 6 is a one-direction valve that lets compressed air through only from the upstream side to the downstream side. This means that the check valve 6 remains open as long as the pressure at the upstream side of the valve 6 is above the pressure at the downstream side of the valve and that the valve 6 closes when the pressure at the upstream side falls under the pressure at the downstream side. For example, if an air leak occurs in the air tank 4, leading to a pressure drop in the air tank, then the check valve 6 closes and the pressure in the spring brake cylinder(s) is maintained (i.e. does not decrease due to the connection with the air supply). Accordingly, there is no risk of activating the parking brake in case of an accidental pressure drop in the air supply 4.

The EPB system 2 includes an electro-pneumatic control unit 8 and a relay valve 12.

The relay valve 12 is known per se, for example from US 2010/0025141 A1. It comprises a first port 12a connected to the check valve 6, a second port 12b connected to the electro-pneumatic control unit 8, a third port 12c connected to the park brake actuator(s) 10 and a fourth port 12d which is in communication with the atmosphere.

18 denotes the connecting line between the check valve 6 and the relay valve 12. 22 denotes the connecting line between the electro-pneumatic control unit 8 and the relay valve 12. 30 denotes the connecting line between the relay valve 12 and the park brake actuator(s). In the example, 30.1 and 30.2 denote respectively the connecting lines between the relay valve 12 and the two park brake actuators 10.

The electro-pneumatic control unit 8 includes an Electronic Control Unit (ECU) 80 that is electrically powered by a battery 20. Typically, the battery 20 may be the vehicle battery. The electro-pneumatic control unit 8 includes control means (not represented) for controlling the pressure in the connecting line 22. Typically, control means may comprise a proportional valve that is electrically piloted by the ECU 80 through the maneuvering of the park brake input device.

The relay valve 12 is configured so that the pressure in line 30, and therefore in lines 30.1 and 30.2, is proportional to the pressure in line 22. Accordingly, a pressure drop in line 22 implies a pressure drop in line 30, and therefore in lines 30.1 and 30.2, leading to the activation of the parking brake. On the contrary, a pressure rise in line 22 leads to a pressure rise in line 30, and therefore in lines 30.1 and 30.2, leading to the parking brake release. It is to be noted that the pressure in line 30 is never greater than the pressure in line 18.

Typically, when the parking brake is activated, the compressed air contained in the spring brake cylinder of each park brake actuator 10 is vented through the fourth port 12d of the relay valve 12, which is opened to the atmosphere.

The EPB system 2 also includes an electrically actuated valve 14, which is controlled by the electro-pneumatic control unit 8 and which includes a first orifice 14a connected to a compressed air line 16 extending between the check valve 6 and the air supply 4. 28 denotes the connecting line between the first orifice 14a of the electrically actuated valve 14 and the compressed air line 16. The first orifice 14a then opens upstream of the check valve 6 on the path of compressed air flowing in line 16.

The electrically actuated valve 14 also includes a second orifice 14b connected to the compressed air line 18 extending between the check valve 6 and the first port 12a of the relay valve 12 and a third orifice 14c connected to the electro-pneumatic control unit 8. 26 denotes the connecting line between the second orifice 14b of the electrically actuated valve 14 and the compressed air line 18 and 24 denotes the connecting line between the third orifice 14c of the electrically actuated valve 14 and the electro-pneumatic control unit 8.

The compressed air lines 22 and 24 can be connected to each other. In particular, the proportional valve mentioned above may be arranged at the junction between lines 22 and 24. When the parking brake is released, the pressure in line 22 is a function of the pressure in line 24, as there is a connection between lines 22 and 24. In particular, the pressure in line 22 varies proportionally to the pressure on line 24. However, when the parking brake is applied, the pressure in line 22, which is close to 0 bar, does not depend on the pressure in line 24, which can be of 8.5 bar for instance. This means that, when the parking brake is applied, the lines 22 and 24 are no more connected to each other.

On FIGS. 1 to 5, four small bargraphs represent the level of pressure in the air tank 4, in the connecting line 24, in the connecting line 22 and in the spring brake cylinder chamber of each park brake actuator 10.

Preferably, the electrically actuated valve 14 is a 3/2 way valve. This means that the electrically actuated valve 14 is capable of taking up 2 configurations, i.e. 2 positions, and that the electrically actuated valve 14 includes 3 connecting orifices, which are respectively the orifices 14a to 14c. A connecting orifice is an orifice that can be connected with another orifice of the valve 14, not to be confused with a pilot orifice, which is used to switch the valve configuration and which cannot be connected with another orifice of the valve.

In the example, the orifices 14a to 14c are all connecting orifices. More precisely, orifices 14a and 14b are inlet orifices that can be selectively connected with orifice 14c, which is an outlet orifice. Then, the orifice 14c is either connected with the orifice 14a or with the orifice 14b. The inlet orifices 14a and 14b cannot be connected one with the other.

Typically, the electrically actuated valve 14 is an electromagnetically actuated valve, comprising a solenoid 140 and an elastic return means 142, such as a spring. The solenoid 140 is electrically supplied via the electro pneumatic module 8.

In the example, the electrically actuated valve 14 is capable of taking up a first configuration (represented on FIG. 1), wherein the second orifice 14b is connected to the third orifice 14c and a second configuration (represented on FIGS. 2 and 3), wherein the first orifice 14a is connected to the third orifice 14c. This means that, in the first configuration, the compressed air lines 24 and 26 are connected to each other and that, in the second configuration, the compressed air lines 24 and 28 are connected to each other.

Advantageously, the electrically actuated valve 14 remains in the first configuration as long as it is electrically supplied, i.e. as long as the solenoid 140 is electrically supplied.

FIG. 1 represents a normal driving conditions mode, wherein electrical power is available and wherein the electrically actuated valve 14 is electrically supplied. In this mode, the solenoid 140 generates a magnetic field that maintains the electrically actuated valve 14 in the first configuration. On FIG. 1, the lightning flashes between the battery 20 and the electro-pneumatic control unit 8 and between the electro-pneumatic control unit 8 and the valve 14 indicate that the electrical connections are established (healthy).

Figure 2:
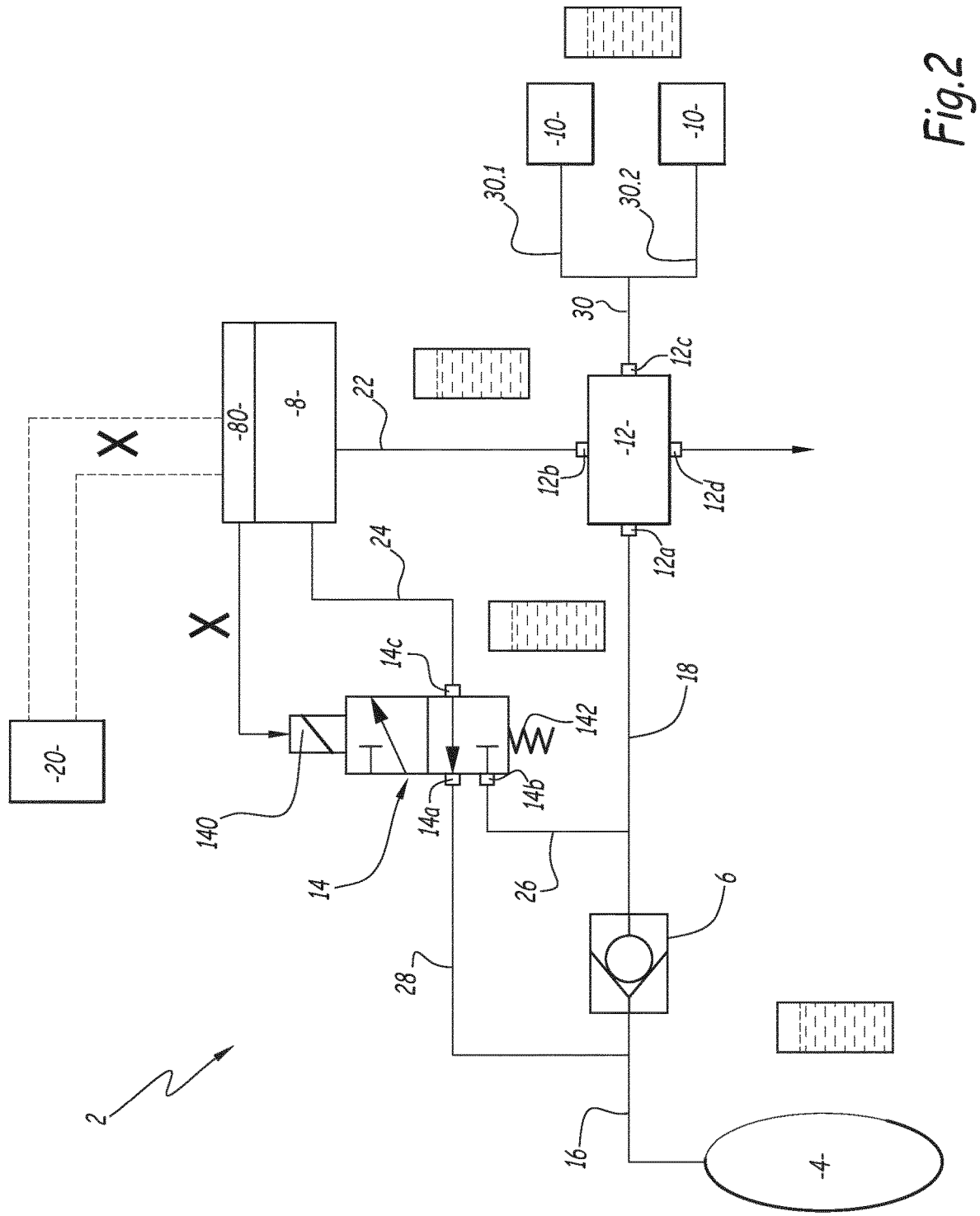
FIG. 2 is flow chart analog to that of FIG. 1, representing the electronic parking brake system in the event of an electrical failure.

FIG. 2 represents a failure mode wherein the EPB system 2 can no more be controlled by the park brake input device. Typically, the failure may be an electrical failure, because of which the solenoid 140 can no more be electrically supplied. The failure may also be an internal failure of the EPB itself, as a result of which the solenoid 140 is voluntarily no more electrically powered by ECU 80. Accordingly, when such failure occurs, the valve 14 cannot be electrically controlled. On FIG. 2, the crosses between the battery 20 and the electro-pneumatic control unit 8 and between the electro-pneumatic control unit 8 and the valve 14 indicate that the electrical connections are shut down.

In the event of loss of electrical power, the 3/2 way valve 14 is no more electrically controlled but mechanically (spring) controlled. The electrical power loss provokes the change of configuration of the valve 14: the valve 14 switches from the first configuration (FIG. 1) to the second configuration (FIG. 2). In the second configuration, the compressed air lines 24 and 28 are connected to each other. The lines 16, 28 and 24 are then at the same pressure. A pressure drop in line 28 then leads to a pressure drop in line 24 which, in turn, leads to a pressure drop in line 22. Accordingly, the driver may apply the parking brake by provoking a pressure drop in line 28, i.e. in the air supply 4. Advantageously, the driver may cause a pressure drop in the air supply 4 by successively depressing the service brake pedal (not represented) of the vehicle. Indeed, the service brake of the vehicle is purely pneumatic and remains operable even in the event of an electrical failure. When the driver depresses the brake pedal, compressed air is consumed and the pressure in the air tank 4 drops.

Figure 3:
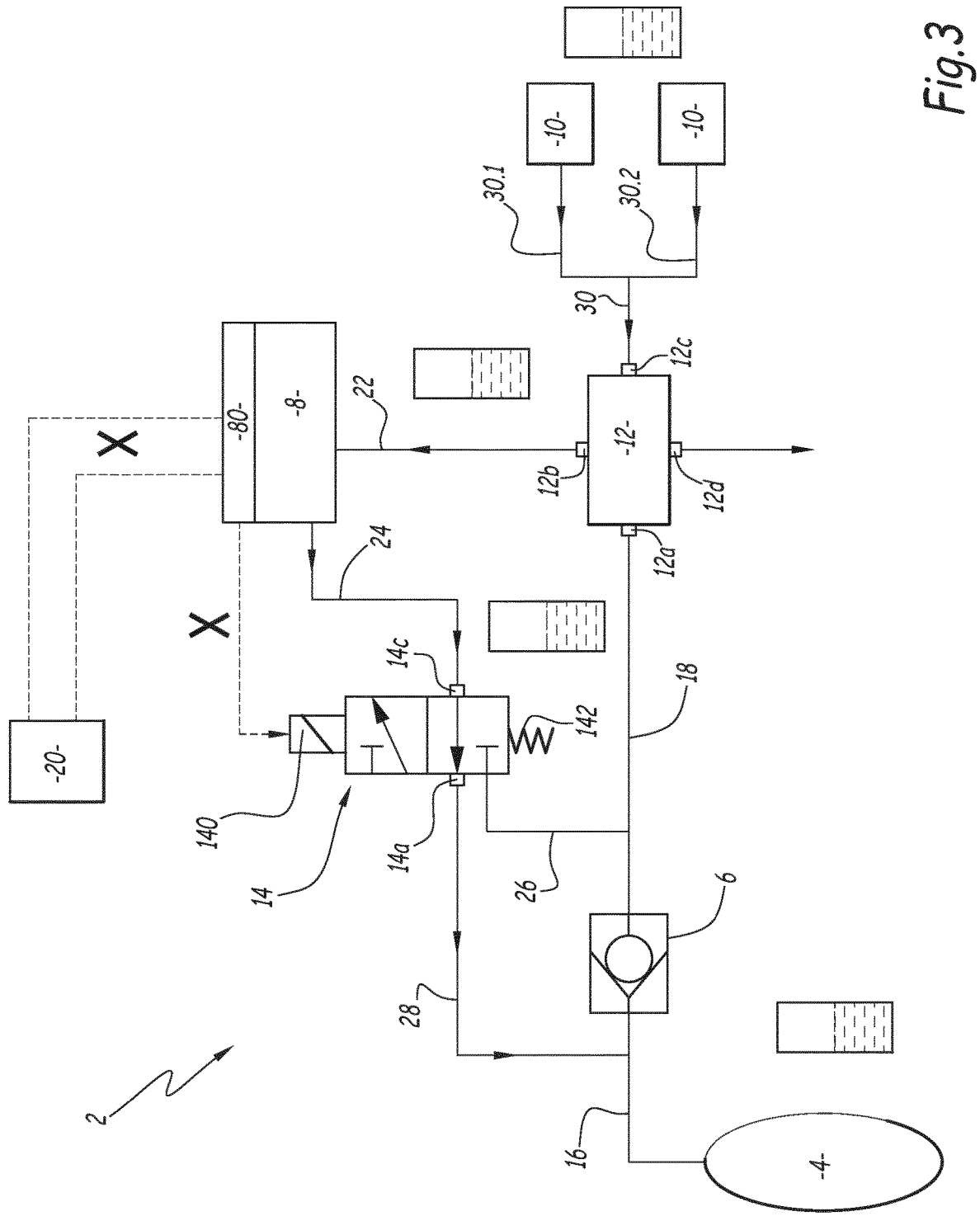
FIG. 3 is a flow chart analog to that of FIGS. 1 and 2, representing the electronic parking brake system in the event of an electrical failure and of low pressure conditions in the air supply.

As shown on FIG. 3, when the driver voluntarily consumes compressed air from the air supply 4, the pressure drop in the air tank 4 leads to a pressure drop in the connecting lines 22 and 24, and also to a pressure drop in the connecting line 30. This results in a pressure drop in the spring brake cylinder chamber of each park brake actuator 10.

Accordingly, the pressure in the spring brake cylinder chamber of each park brake actuator 10 becomes not high enough to counteract the force of the spring and there is a braking effort arising from spring unloading: the parking brake is applied, or at least partially applied. Indeed, to be fully applied, the pressure in the spring brake cylinder chamber of each park brake actuator 10 must be close to 0 bar, meaning that the pressure in the air tank 4 must also be close to 0 bar. This means that the driver has to consume the integrality of the compressed air stored in the air tank 4 to fully apply the parking brake. However, in practice, the driver has to depress the brake pedal a number of times before the air tank 4 is completely empty.

Therefore, this system 2 is not convenient for parking a vehicle on a downhill, especially when the vehicle is a fully loaded lorry unit, because maximum braking effort is needed in this case to immobilize the vehicle.

Figure 4:
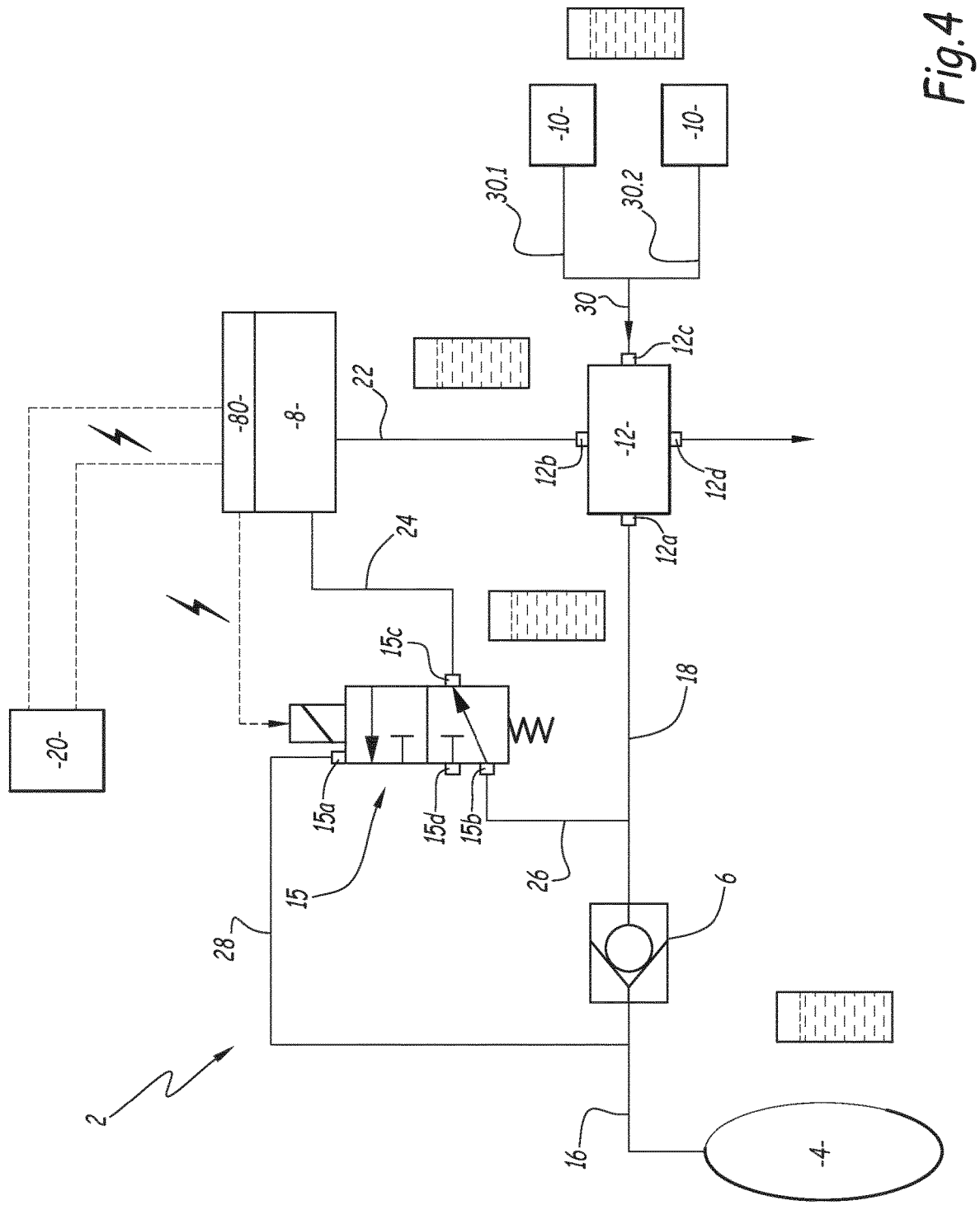
FIG. 4 is flow chart analog to that of FIG. 1, representing a second embodiment of an electronic parking brake system in normal working conditions.
Figure 5:
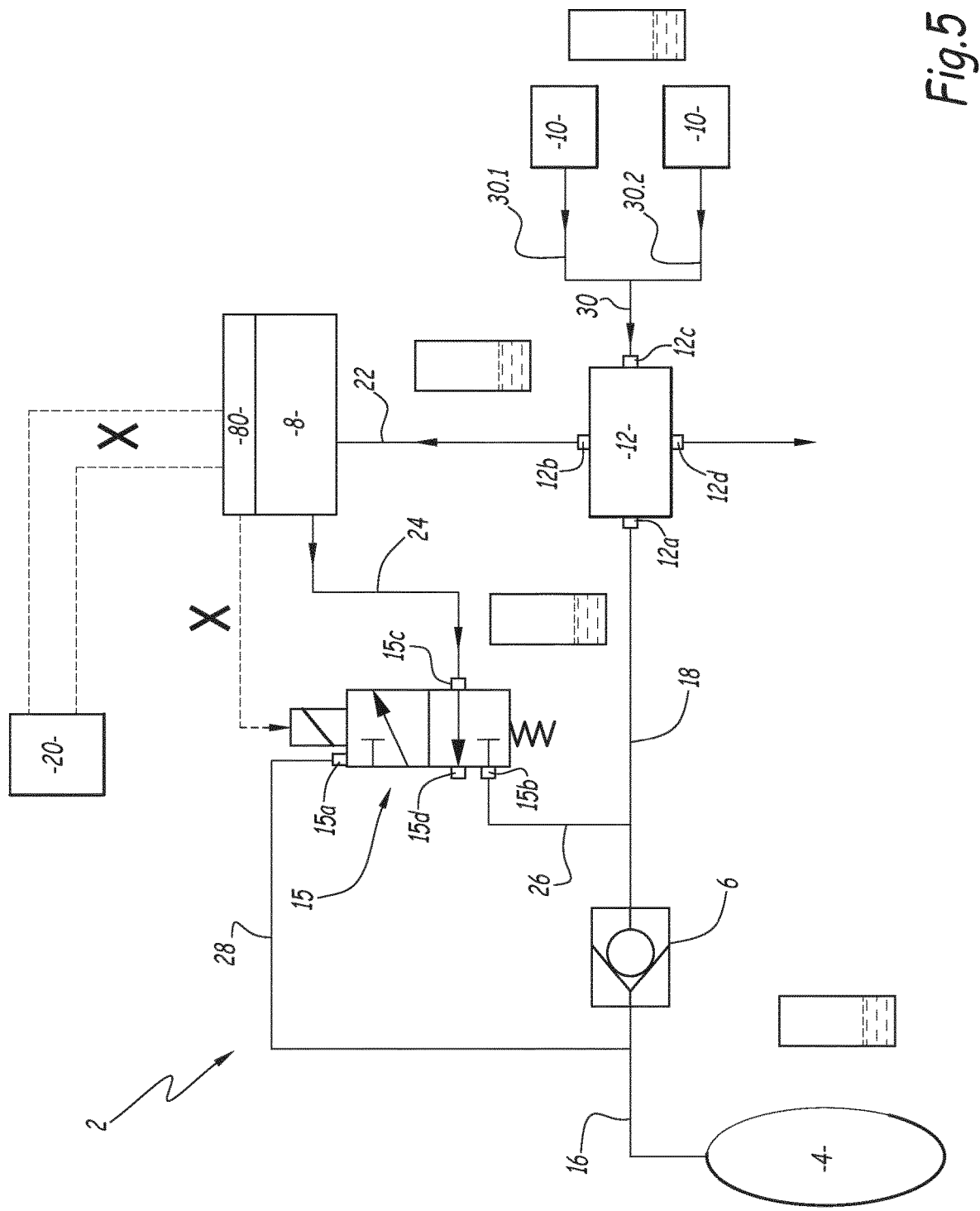
FIG. 5 is a flow chart analog to that of FIG. 3, representing the electronic parking brake system according to the second embodiment in the event of an electrical failure and of low pressure conditions in the air supply.
Figure 6:
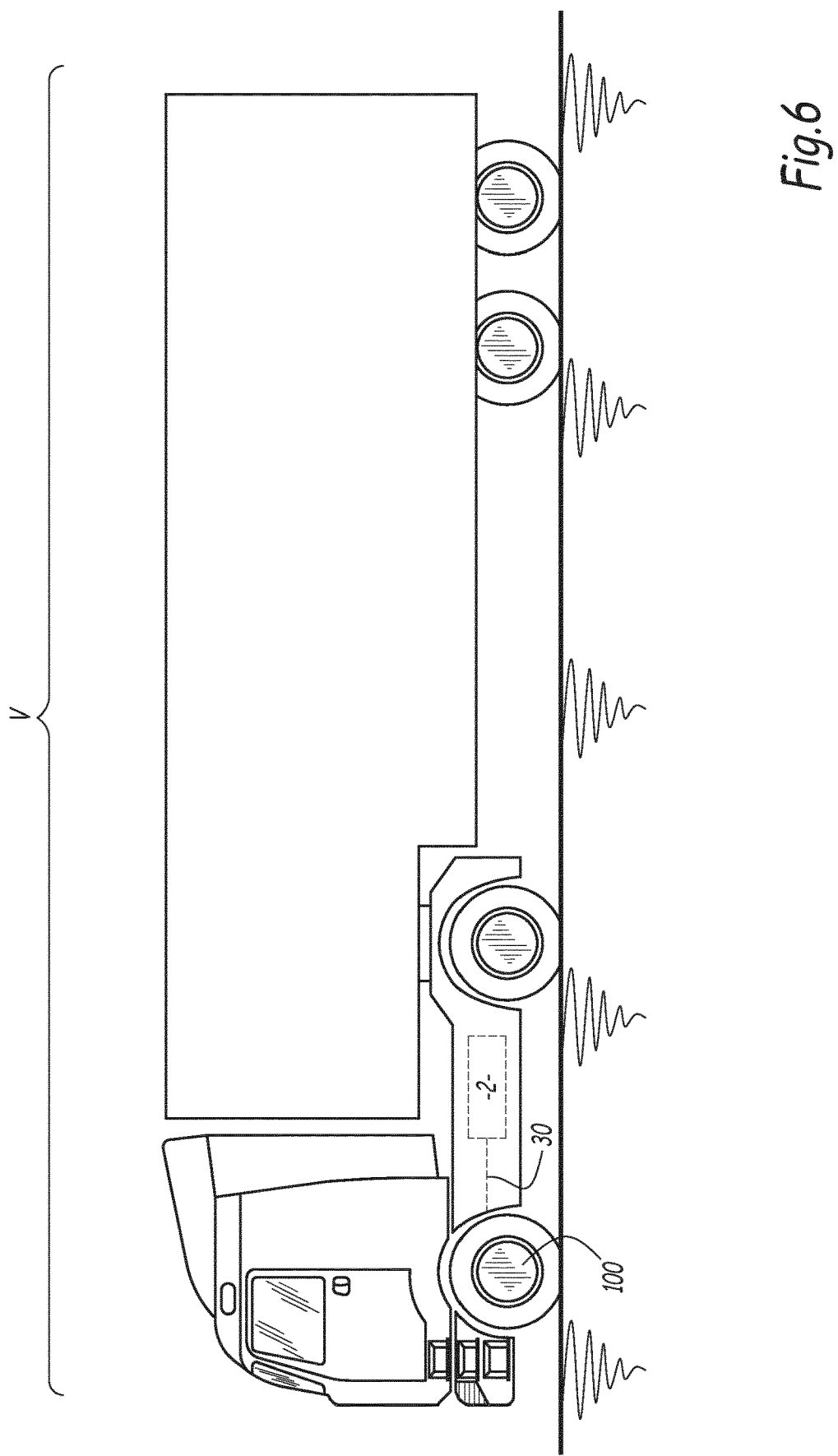
FIG. 6 represents a vehicle equipped with an electronic parking brake system according to the invention.

This problem no more exists in the embodiment of FIGS. 4 and 5, which represent the second embodiment of the invention. In the following, only the differences with respect to the first embodiment are depicted for the purpose of conciseness.

In the second embodiment, the electrically actuated valve 15 further includes a vent orifice 15d. The electrically actuated valve 15 then includes four orifices, among which three of them (15b, 15c, 15d) are connecting orifices and one of them (15a) is a pilot orifice. This means that the orifice 15a cannot be put in communication with another orifice of the valve 15 and that the only function of the orifice 15a is to command the switching of the valve 15 in the event of an electrical failure.

The first orifice 15a is connected to a compressed air line 16 extending between the check valve 6 and the air supply 4. The second orifice 15b is connected to another compressed air line 18 extending between the check valve 6 and the first port 12a of the relay valve 12. The third orifice 15c is connected to the electro-pneumatic control unit 8.

In the first configuration of the valve 15, there are no differences with respect to the first embodiment. However, in the second configuration, the third orifice 15c is connected to the vent orifice 15d, meaning that the compressed air lines 22 and 24 are vented to the atmosphere.

Unlike the first embodiment, when the valve 15 is not electrically supplied, it is designed for switching into the second configuration only when the pressure in the air supply 4 falls below a critical threshold value. Typically, the valve 15 switches into the second configuration when the pressure of the air entering by the orifice 15a is not high enough to counteract the force of the spring of valve 15. The spring then moves from a loaded position to an unloaded position.

In other words, the valve 15 switches into the second configuration only when a pressure drop occurs in the air supply 4. It is then the job of the driver to provoke such pressure drop. Advantageously, the driver may cause a pressure drop in the air supply 4 by successively depressing the service brake pedal (not represented) of the vehicle. When the driver depresses the brake pedal, compressed air is consumed and the pressure in the air tank 4 drops.

As long as the pressure in the air supply 4 is above the critical threshold value, the valve 14 remains in the first configuration and the lines 24 and 26 are connected to each other. The lines 18, 24 and 26 are then at the same pressure and the check valve 6 keep ensuring his function of protection. In this configuration, the spring brake cylinder chamber of each park brake actuator 10 remains pressurized and the parking brake system 2 is fully released.

However, when the pressure in the air supply 4 falls below the critical threshold value, lines 22 and 24 are vented, i.e. connected to the atmosphere through the vent orifice 15d. As a reminder, the pressure in the spring brake cylinder chamber of each park brake actuator 10 is proportional to the pressure in the compressed air line 22. Accordingly, this results in a severe pressure drop in the spring brake cylinder chamber of each park brake actuator 10, leading to a full parking brake activation. Therefore, as soon as the pressure of the air supply 4 is voluntarily decreased below the threshold critical value, the parking brake is fully applied.

Alternatively, in the event of an electrical failure, the driver may consume compressed air from the air supply other than by depressing the brake pedal. For example, the driver may have to depress a specific button provided on the park brake input device.

The invention is not limited to the described embodiments. The features of the embodiments and not-represented alternative embodiments may be combined to generate new embodiments of the invention.

The invention claimed is:

1. An electronic parking brake system, comprising:
   an air supply,
   a check valve, connected to the air supply,
   an electro-pneumatic control unit,
   at least one park brake actuator, having a spring brake cylinder which includes a pressurized chamber with a spring, where the pressurized chamber is to be vented when an application of the parking brake is requested,
   a relay valve, comprising a first port connected to the check valve, a second port connected to the electro-pneumatic control unit via a park brake control line, a third port connected to the park brake actuator and a fourth port which is in communication with the atmosphere, and
   an electrically actuated valve, which is controlled by the electro-pneumatic control unit and which includes a first orifice connected to a first compressed air line extending between the check valve and the air supply, a second orifice, a third orifice connected to the electro-pneumatic control unit via an air supply connecting line, and a vent orifice, wherein the second orifice is connected to a second compressed air line extending between the check valve and the first port of the relay valve, wherein the electrically actuated valve is capable of taking up a first configuration wherein the second orifice is connected to the third orifice and a second configuration wherein the third orifice is connected to the vent orifice, wherein, in the second configuration, the air supply connecting line and the park brake control line are vented via the vent orifice, thereby causing the pressurized chamber to be vented via the relay valve, and wherein the electrically actuated valve is designed for switching into the second configuration as soon as the electrically actuated valve is no longer electrically supplied.

2. The electronic parking brake system according to claim 1, wherein the electrically actuated valve is a 3/2 way valve.

3. The electronic parking brake system according to claim 1, wherein the electrically actuated valve is an electromagnetically actuated valve, comprising a solenoid.

4. The electronic parking brake system according to claim 1, wherein the electrically actuated valve includes a return mechanism to switch the electrically actuated valve from the first configuration to the second configuration.

5. The electronic parking brake system according to claim 1, wherein, when it is not electrically supplied, the electrically actuated valve is designed for switching into the second configuration only when the pressure in the air supply falls below a critical threshold value.

6. The electronic parking brake system according to claim 1, wherein the first orifice is a pilot orifice that cannot be connected to the other orifices of the electrically actuated valve.

7. A vehicle comprising an electronic parking brake system according to claim 1.

* * * * *